United States Patent [19]

Von Jordan et al.

[11] Patent Number: 4,877,598

[45] Date of Patent: Oct. 31, 1989

[54] CONTINUOUS PROCESS FOR THE DRY SLAKING OF LIME

[75] Inventors: Wenzel Von Jordan, Darmstadt; Rolf Draf, Friedrichsdorf; Dieter Gröne, Worms; Harald Sauer, Frankfurt, all of Fed. Rep. of Germany

[73] Assignee: Metaligesellschaft Aktiengesellschaft, Frankfurt am Main, Fed. Rep. of Germany

[21] Appl. No.: 319,435

[22] Filed: Mar. 3, 1989

[30] Foreign Application Priority Data

Mar. 3, 1988 [DE] Fed. Rep. of Germany ....... 3806798

[51] Int. Cl.$^4$ ............................................. C04B 2/04
[52] U.S. Cl. .................................................... 423/640
[58] Field of Search ......................................... 423/640

[56] References Cited

U.S. PATENT DOCUMENTS

| | | | |
|---|---|---|---|
| 1,565,107 | 12/1925 | Rich | 423/640 |
| 3,165,380 | 1/1965 | Warner | 423/640 |

FOREIGN PATENT DOCUMENTS

| | | | |
|---|---|---|---|
| 3203 | of 1899 | United Kingdom | 423/640 |
| 637756 | 5/1950 | United Kingdom | 423/640 |

Primary Examiner—Robert L. Stoll
Assistant Examiner—Wayne A. Langel
Attorney, Agent, or Firm—Herbert Dubno

[57] ABSTRACT

The dry slaking of lime is carried out continuously in a vessel from which an exhaust gas is removed. Hot gas, preferably a flue gas to be desulfurized, is added to the exhaust gas to prevent it from contacting the inner surface of the exhaust gas duct and thereby reduce the tendency for deposits in lines traversed by the exhaust gas.

6 Claims, 1 Drawing Sheet

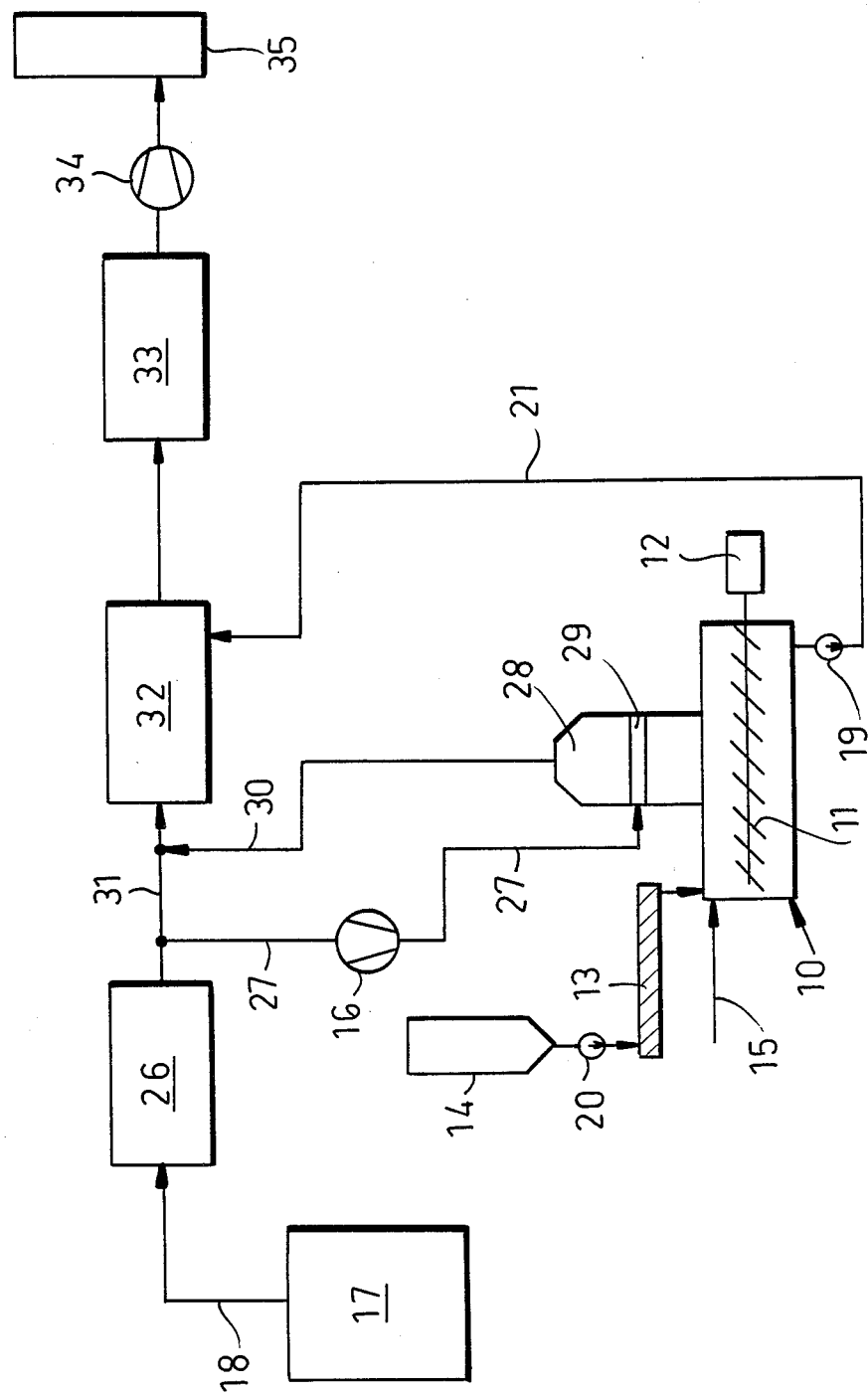

CONTINUOUS PROCESS FOR THE DRY SLAKING OF LIME

FIELD OF THE INVENTION

Our present invention relates to the dry slaking of lime and, more particularly, to a continuous process for the dry slaking of lime, i.e. for the reaction of finely ground lime with a quantity of water under conditions and in an amount in which the product remains dry and slaked lime is withdrawn from the generally closed slaking apparatus.

BACKGROUND OF THE INVENTION

In a process for the continuous dry slaking of lime, a closed vessel is generally provided and can have storing means, ports for separately feeding CaO and slaking water, and means for withdrawing $Ca(OH)_2$ and means for removing an exhaust gas. The exhaust gas mainly consists of water vapor diluted with entrained air and usually also contains water droplets and a high quantity of dust.

The dust can consist of CaO und $Ca(OH)_2$ although the $Ca(OH)_2$ generally predominates because the slaking of the CaO particles continues in the water vapor containing exhaust gas.

The hydrate of lime entrained as a dust in the exhaust gas or formed therein by the continued slaking of the lime tends to form deposits and encrustations in the pipeline, particularly in the region of a nozzle for feeding the slaking water.

In known lime slaking plants, the deposits and encrustations which form do not allow truly continuous operation because reliable operation cannot be maintained as the passages become blocked and unless the deposits are removed. For that removal, the plant must be shut down.

OBJECTS OF THE INVENTION

It is, therefore, the principal object of the present invention to provide a process for the dry slaking of lime which is truly continuous and in which the formation of deposits and encrustations, where they may be obstructive, can be eliminated or greatly decreased so that the plant can operate more economically.

It is another object of the invention to provide a process for the continuous dry slaking of lime where the formation o deposits due to a high $Ca(OH)_2$ content of the exhaust gas can be prevented or excluded and whereby the drawback of earlier methods and plants can be eliminated.

SUMMARY OF THE INVENTION

We have discovered, quite surprisingly, that the formation of such deposits in passages traversed by the exhaust gas can be reduced or even eliminated by adding to the exhaust gas a hot gas in a quantity and at temperature sufficient to prevent that the liquid-solid suspension entrained in the exhaust gas gets in contact with the inner surface of the exhaust gas duct and to increase the temperature of the exhaust gas to prevent condensation at the inner surface of the exhaust gas duct.

More specifically, the process of the invention can comprise the steps of:
(a) continuously feeding finely ground lime and only sufficient water to dry slake the continuously fed lime to a slaking vessel and slaking the lime with the water in the vessel to produce a slaked hydrated lime;
(b) continuously withdrawing the slaked hydrated lime from the vessel;
(c) evacuating an exhaust gas containing lime dust and water vapor from the vessel; and
(d) adding to the exhaust gas a hot gas at a temperature and in an amount sufficient to prevent deposits of calcium hydroxide from the exhaust gas on the inner surface of the exhaust gas duct.

As a consequence of the addition of the hot gas to the exhaust gas, the exhaust gas is prevented from contacting the inner surface of the exhaust gas duct in the critical region and is heated and dried so that deposits and crusts which are favored by the humid gas will be diminished or eliminated.

Of course, as the formation of such deposits and encrustation is reduced, the ability to operate the process for a longer period of time without shutdown of the plant is increased. The rate of addition of the hot gas and its temperature will be selected with a view to optimum economy and the relevant boundary conditions.

According to a feature of the invention, the hot gas is fed to the exhaust gas tangentially to the exhaust gas stream at a right angle thereto to prevent the exhaust gas from contacting the inner surface of the exhaust gas duct.

According to another feature of the invention, the finely ground lime is ground to a particle size $d_5$ of between substantially 40 and 60 micrometers prior to being fed to the vessel and the dry slaking is effected in the vessel at a temperature between substantially 70° and 90° C.

We have found that it is advantageous to add the hot gas to the exhaust gas so that the resulting mixture will have a temperature between substantially 90° and 150° C. and a relative humidity between 80 and 95%.

Following, adding of the hot gas to the exhaust gas, the gas mixture can be dedusted and when the hot gas is a flue gas from a combustion process, e.g. from a fossil-fuel power plant, the flue gas is concurrently desulfurized by reaction with the lime in the exhaust gas.. The dedusting can be effected in the flue gas cleaning plant according to the invention.

According to another feature of the invention, the dry slaking plant is used to produce the desulfurizing agent for desulfurizing flue gases produced at a high rate by, for example, a fossil-fuel power plant.

The flue gas to be desulfurized usually has a temperature which is suitable for its use as the hot gas in the process according to the invention and is available at an adequate rate.

As a consequence, the exhaust gas from the dry slaking process can be dedusted in the dedusting apparatus which is customarily provided for removing particulates from the flue gas to be desulfurized so that the dedusting apparatus need not involve an appreciable additional expense.

The $Ca(OH)_2$ containing exhaust gas from the dry slaking process can be directly used as a desulfurizing agent for the flue gas and thus is directly introduced into the stream of flue gas to be desulfurized.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the invention.

SPECIFIC DESCRIPTION

In the drawing, the closed vessel 10 forming the slaking apparatus is shown to be provided with a stirrer or mixer 11 having a motor 12 and to be provided with a feeder 13 for supplying the finely ground lime to be slaked from a hopper 14 to the vessel 10.

Line 15 represents the nozzles for introducing slaking water to the vessel 10.

The slaked lime is discharged by means 19 and may be fed directly via the line 21 to a desulfurization plant 32 as a desulfurizing agent for a flue gas of a power plant 22.

Particulates can be initially removed from the flue gas from the power plant in a dedusting unit 26 and a portion of that hot flue gas can be branched at 27 via fan 16 to serve as the hot gas for adding to the exhaust gas in accordance with the principles of this invention. A duct 28 traversed by the exhaust gas is shown to be provided with a lateral and tangential inlet 29 to allow the hot gas from line 27 to be added to the moist exhaust gas in a direction which is both tangential and at a right angle thereto.

The gas mixture at 30, which is relatively dry, can be combined with the balance of the flue gas from line 31 and fed to a desulfurization plant 32 forming part of a dedusting plant. The gas then passes to a dedusting unit 33 forming a further element of the dedusting apparatus before being discharged by a blower 34 to a stack 35 for venting into the atmosphere.

SPECIFIC EXAMPLE

Utilizing a plant generally as illustrated, lime having a particle size $d_{50}$ between 40 and 60 micrometers is slaked in a vessel 10 with water at a temperature of 70° to 90° C. and dry calcium hydrate is recovered and fed to a fossil-fuel power plant as the desulfurizing agent thereof. Part of the hot flue gas from the power plant is added to the exhaust gas from the vessel so that the mixture of exhaust gas and flue gas has a temperature of 120° C. and a relative humidity of 90%. The gas mixture is then fed to the dedusting portion of the power plant together with the main part of hot flue gas.

Utilizing the addition of the flue gas to the exhaust gas, we were able to increase the operating time before stoppage for removal of deposits by at least five times by comparison with a plant operating similarly but without the addition of hot gas to the exhaust gas. The early shutdown in the latter case was found to be due to deposits in the exhaust gas lines.

We claim:

1. A process for the dry slaking of lime, comprising the steps of:
    (a) continuously feeding finely ground lime and only sufficient water to dry slake the continuously fed lime to a slaking vessel and slaking the lime with the water in said vessel to produce a slaked hydrated lime;
    (b) continuously withdrawing said slaked hydrated lime from said vessel;
    (c) evacuating an exhaust gas containing lime dust and water vapor from said vessel; and
    (d) adding to said exhaust gas a hot gas in a direction which is tangential and at a right angle to said exhaust gas, said hot gas being at a temperature and in an amount sufficient to prevent the exhaust gas from contacting the inner surface of the exhaust gas duct and to prevent deposits of calcium hydroxide from said exhaust gas.

2. The process defined in claim 1 wherein the finely ground lime continuously fed to said vessel in step (a) has a particle size $d_{50}$ between about 40 and 60 micrometers.

3. The process defined in claim 2 wherein the dry slaking said vessel is carried out at a temperature between 70° and 90° C.

4. The process defined in claim 3 wherein the temperature and amount of the hot gas added to the exhaust gas in step (d) is such that the mixture of said hot gas with said exhaust gas has a temperature between about 90° and 150° C. and a relative humidity of about 80 to 95%.

5. The process defined in claim 4, further comprising the step of dedusting said mixture.

6. The process defined in claim 4 wherein the exhaust gas is used to desulfurize an $SO_2$-containing flue gas.

* * * * *

UNITED STATES PATENT AND TRADEMARK OFFICE
CERTIFICATE OF CORRECTION

PATENT NO. : 4,877,598
DATED : 31 October 1989
INVENTOR(S) : Wenzel Von Jordan et al.

It is certified that error appears in the above-identified patent and that said Letters Patent is hereby corrected as shown below:

Cover Page, Left Column:

[75] Inventors: The second Inventor's name should read --Rolf Graf--.

and

[73] Assignee : The Assignee's name should read Metallgesellschaft Aktiengesellschaft.

Signed and Sealed this

Thirtieth Day of October, 1990

Attest:

HARRY F. MANBECK, JR.

*Attesting Officer*  *Commissioner of Patents and Trademarks*